J. Taggart.
Screw Propeller.

№ 23,432. Patented Mar. 29, 1859.

Witnesses:
R H Eddy
Arthur Neill

Inventor:
John Taggart

UNITED STATES PATENT OFFICE.

JOHN TAGGART, OF ROXBURY, ASSIGNOR TO HIMSELF, AND GEORGE R. SAMPSON, OF BROOKLINE, MASSACHUSETTS.

IMPROVED MARINE PROPELLER.

Specification forming part of Letters Patent No. 23,432, dated March 29, 1859.

*To all whom it may concern:*

Be it known that I, JOHN TAGGART, of Roxbury, in the county of Norfolk and State of Massachusetts, have invented a new and useful Improvement in the Propulsion of Navigable Vessels through Water; and I do hereby declare that the same is fully described and represented in the following specification and the accompanying drawings, of which—

Figure 1:
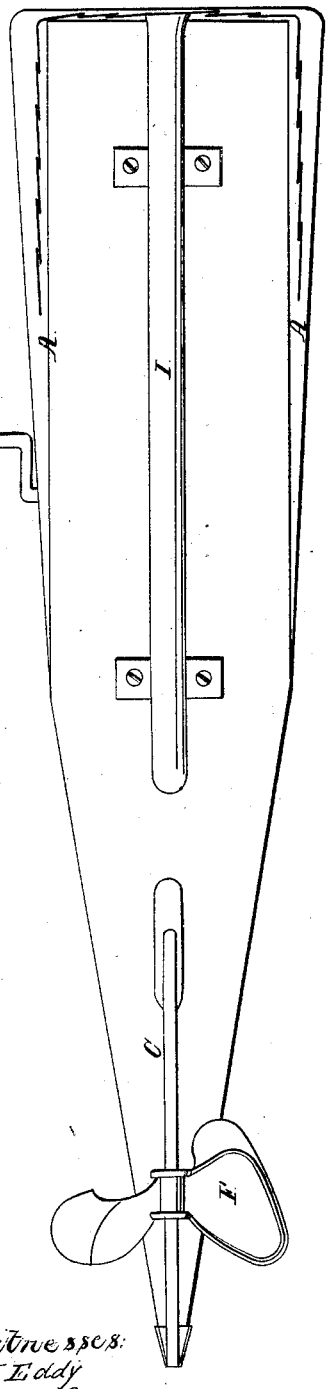
Figure 2:
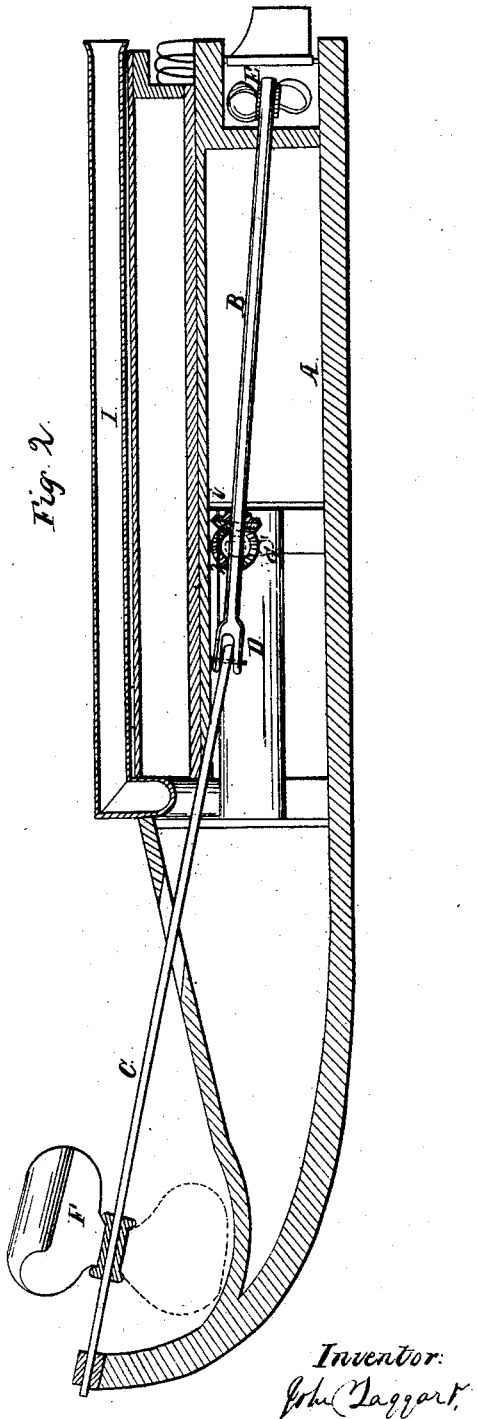

Figure 1 is a top view, and Fig. 2 a vertical and longitudinal section, of the hull of a vessel furnished with my improvement.

In such drawings, A denotes the hull, while B and C represent two shafts arranged longitudinally in the hull and coupled together in the hold by a universal joint D. The shaft B extends out of the hold at the stern thereof and carries a screw-propeller E to work or screw into the water, within which the hull or vessel may be afloat. The other shaft—viz., C—passes upward in an inclined position with respect to the keel, plane of flotation, or the deck, and through the deck of the vessel and toward and over the bow and into the air or atmosphere outside of the hull and carries a screw-propeller F to work or screw into the air.

The driving-shaft of a steam-engine or motive power within the hull is shown at G, and may be so applied to or connected with the rear propeller-shaft by bevel-gears $h$ $i$ or equivalent means as to enable such shaft, with its water-propeller, to be revolved by the motor or engine or motor and to simultaneously put in revolution the shaft of the air screw-propeller, so as to set such screw-propeller in action in a manner to cause it to screw into the air and propel the vessel along, the water-propeller at the same time being made to screw into the water, so as to aid in the propulsion of the vessel. When a vessel has such means of propulsion, it is advisable to construct it with a sharp bow, a very flat run, and a broad stern. It may have a covered deck, and its engine or smoke pipe where it extends above the deck or roof may project horizontally backward toward and over the stern, as shown in the drawings.

If we suppose the boat or vessel to be anchored in a very swift-running current, it will be evident that the action of such current against the water screw-propeller will have a tendency to cause it to revolve and put the air screw-propeller in rotation. Again, if we suppose the motive power of the engine sufficient to operate both screw-propellers at once, the vessel will be driven or propelled by their conjoint action. The speed, however, will be beyond what can be imparted by the water-propeller alone, and therefore the excess of speed will cause the water-propeller to drag in the water. This drag of the water-propeller against the water will operate to increase its rotations, and thereby facilitate the action of the wind-propeller. Thus by the employment of the two separate air and water screw-propellers arranged and coupled together, as specified, the water-propeller will not only be made to perform the duty of propelling the vessel, but that of facilitating the rotary action of the air screw-propeller. Thus by connecting the two propellers essentially as specified I am able to attain great speed with much less power than would be required were the two propellers so disconnected that the revolutions of one would effect no rotary movement of the other.

I am aware that sails or wind-propellers stationary relatively to the hull have been applied to vessels so as to propel such by a current of wind blowing against such sails. I would remark that the kind of rotary propeller necessary to my invention and to work in the air is not a windmill to be driven by wind or a current of air striking against its vanes or floats; but it is a rotary propeller which is not only to be rotated by a separate power or motor—such as a steam-engine, for instance—placed within and carried by the vessel, but is to press, act, or screw into the surrounding air and by the resistance thereof cause the vessel to be propelled through the water. I am perfectly aware that a rotary windmill or propeller to be moved by air or an impinging current of wind has been applied to the deck of a vessel and connected with one or more screw-propellers or made to operate oars so as to propel a vessel through the water. All the above operate differently from my invention or new mode of propelling a vessel. Furthermore, by the inclined position of the axis or shaft of the air-propeller F with reference to the keel or plane of flotation the said propeller while being rotated not only operates to draw the vessel ahead, but has a tendency to lift her bow more or less out of water, and thereby facilitate her movement by reducing the amount of surface of bow exposed to the resistance of the water.

I would also remark that I am aware that a screw partly submerged in the water has been employed to propel a vessel, in which case the screw operated partly in the air. This, however, differs materially from my invention and cannot be employed to like advantage.

I am also aware that it is not new to communicate motion in or into bodies wholly or in part surrounded by water or air by the motion or reaction of apparatus on such water or air, or both. Therefore I lay no claim to such, my invention being confined to particular means and devices for applying the method, such differing from any other hereinbefore recited; nor do I claim propelling a vessel by a single screw working in air and partly submerged in water; nor do I claim propelling a navigable vessel by means of a moving current of wind acting on a wind wheel or mill placed above the deck and connected with a screw-propeller extending into the water astern of the vessel; but What I do claim is—

1. My improved mode of propelling a navigable vessel through the water—viz., by the conjoint action of two separate rotary or screw propellers E and F, respectively operating or screwing into the water and air, arranged and combined substantially as described, and propelled by a steam-engine or motor within or carried by the vessel.

2. Arranging the air screw-propeller F or its axis at an inclination upward from the keel or plane of flotation of the vessel, substantially as shown in Fig. 2, in order that the said propeller while being rotated may operate not only to draw the vessel ahead, but to lift her bow more or less out of water.

In testimony whereof I have hereunto set my signature.

JOHN TAGGART.

Witnesses:
R. H. EDDY,
F. P. HALE, Jr.